UNITED STATES PATENT OFFICE.

GILES HALL, OF JOLIET, ILLINOIS, ASSIGNOR OF ONE-HALF HIS RIGHT TO GEORGE CLUBB, OF SAME PLACE.

IMPROVEMENT IN MEDICAL COMPOUNDS OR SALVES.

Specification forming part of Letters Patent No. 139,954, dated June 17, 1783; application filed May 26, 1873.

*To all whom it may concern:*

Be it known that I, GILES HALL, of the city of Joliet, in Will county and State of Illinois, have invented a certain compound called Salve, to be used for the Treatment of Burns, Scalds, Bruises, &c., of which the following is a specification:

The nature of my invention consists in mixing mutton-tallow, golden-seal, slippery-elm bark, common chalk, ground flax-seed, and oil of origanum in the manner following, to-wit, and about in the following proportions:

I take one pound of mutton-tallow, and after melting the same down, and while hot, stir in two ounces of golden-seal; one-half ounce of ground slippery-elm bark; one-half ounce of common chalk; one-fourth ounce of ground flax-seed; and, after the the mixture has been thoroughly mixed and taken off to cool, I then add four ounces of the oil of origanum; and when cool the same is put in boxes for use, for the purposes as above specified.

Having thus described my invention, what I claim as new, and desire to secure by Letters Patent, is as follows:

1. The combination of the ingredients described, as and for the uses and purposes set forth.

2. The compound set forth, as a new article of manufacture.

GILES HALL.

Witnesses:
 THOS. H. HUTCHINS,
 HERVEY LOWE.